Figure 1:
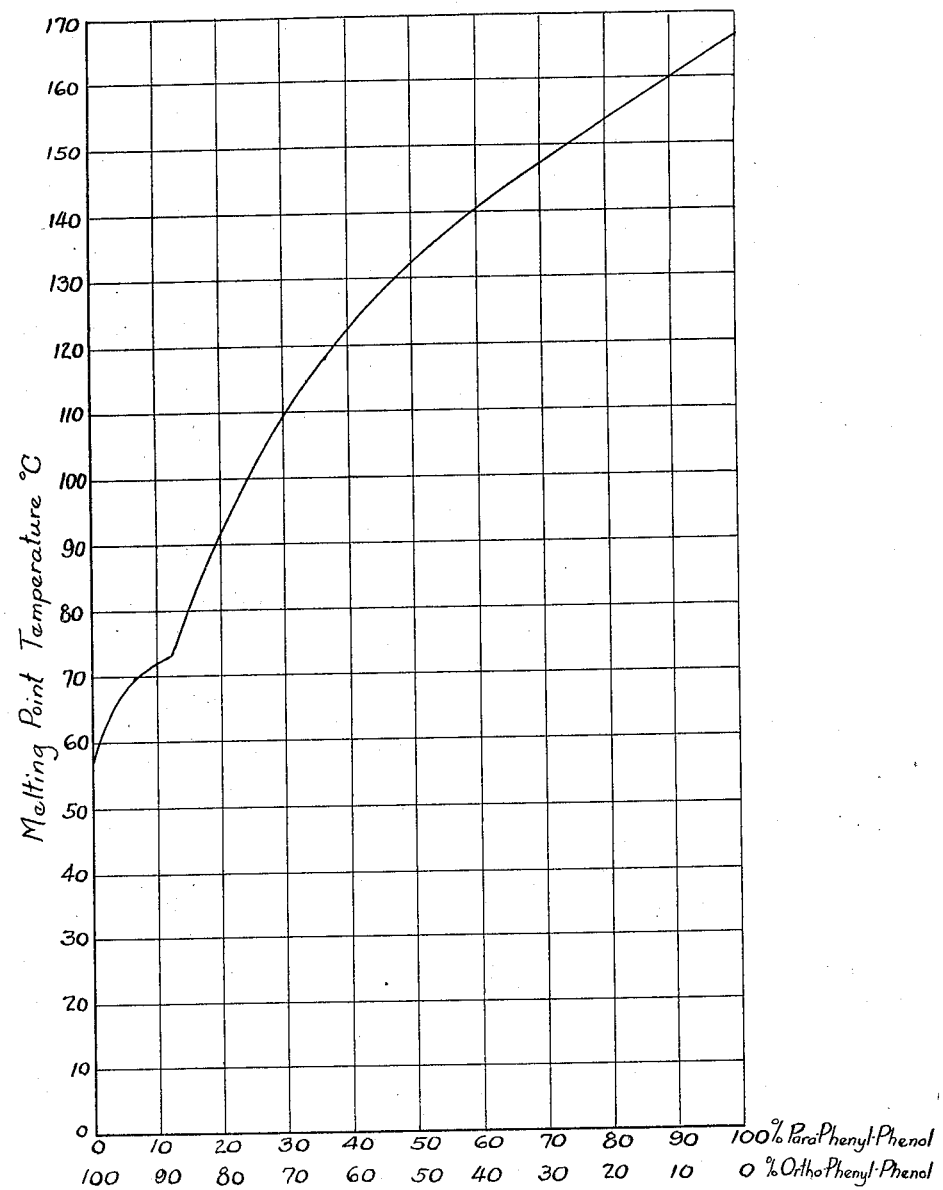

Feb. 2, 1932. E. C. BRITTON ET AL 1,843,706
METHOD OF SEPARATION OF PHENYL PHENOLS
Filed Dec. 5, 1929

INVENTORS
Edgar C. Britton and
BY   Fred Bryner
Thomas Griswold, Jr.
ATTORNEY

Patented Feb. 2, 1932

1,843,706

UNITED STATES PATENT OFFICE

EDGAR C. BRITTON AND FRED BRYNER, OF MIDLAND, MICHIGAN, ASSIGNORS TO THE DOW CHEMICAL COMPANY, OF MIDLAND, MICHIGAN, A CORPORATION OF MICHIGAN

METHOD OF SEPARATION OF PHENYL-PHENOLS

Application filed December 5, 1929. Serial No. 411,760.

The present invention relates to the separation of phenylphenols from mixtures thereof, particularly to methods involving the hydrolysis of alkali metal salts of ortho- and para-phenylphenols in aqueous solution.

Alkali metal salts of the aforesaid phenylphenols are hydrolyzed by water into the free phenylphenols and alkali hydroxide, as represented by the equation,

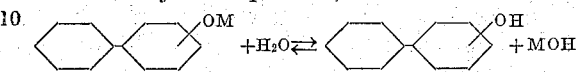

wherein M represents an alkali metal, e. g. sodium or potassium. We have found that the para-salt has a sufficiently greater tendency to hydrolyze than the corresponding ortho-salt so that free para-phenylphenol may be separated in relatively pure form upon dilution of an aqueous solution containing both the ortho- and para-salts before any appreciable separation of the free ortho-compound occurs. Further, from the residual solution ortho-phenylphenol may be obtained in any desired way, such as by continued hydrolysis of the alkali metal salt therein. Accordingly, an object of our invention is the separation of ortho- and para-phenylphenols by hydrolyzing the alkali metal salts thereof in aqueous solution.

Our invention, then, consists of the method hereinafter fully described and particularly pointed out in the claims, the following description and annexed drawing setting forth in detail several modes of carrying out our invention, such disclosed modes illustrating, however, but several of various ways in which the principle of our invention may be used.

In said annexed drawing:—

The figure is a chart giving a curve which shows the relationship between percentage composition of mixtures of ortho- and para-phenylphenols to the melting points thereof.

By way of illustration, our method will be described below as applying to the separation of ortho- and para-phenylphenols from an aqueous solution containing the sodium salts thereof.

Upon diluting such solution, the concentration of alkali hydroxide therein tends to hold at a constant equilibrium value by hydrolysis of the metal salt into free phenylphenol and such hydroxide, as per the above equation. When both sodium ortho- and para-phenylphenates are in solution, as we have found, the para-salt hydrolyzes more readily than the corresponding ortho-salt, and accordingly, para-phenylphenol is formed preferentially and separates from the solution.

Again, the hydrolysis of sodium ortho- and para-phenylphenates in aqueous solution may be controlled to any desired extent by neutralizing the free base with a strong acid as rapidly as it is formed. For instance, sufficient acid to neutralize any desired amount of base may be added to the aqueous solution of the abovementioned phenylphenates to accelerate the hydrolysis and obtain a fractional precipitation of at least one phenylphenol. Accordingly, by controlling the extent of hydrolysis, e. g. by the amount of added acid, it is possible to separate out, first, the para-phenylphenol, and then the corresponding ortho-compound, with possibly an intermediate fraction containing both the ortho- and para-compounds, which latter fraction may be returned to the process.

Further, a mixture of ortho- and para-phenylphenols may be substantially separated by treating the same with aqueous caustic alkali sufficient to react preferentially with and dissolve the more acidic ortho-phenylphenol, the corresponding less acidic para-compound remaining substantially unattacked. In another modification, aqueous caustic alkali equivalent to all of the ortho-phenylphenol and at least a portion of the para-compound, may be used, in which case, if the mixture be heated, the alkali apparently reacts first with the entire amount of ortho-compound and then with the para-compound, and finally the phenylphenate solution thus formed apparently acts as a solvent for more or less of the remaining free para-phenylphenol, depending upon the proportion thereof actually present. Hence, a solution may be prepared, as described, by dissolving a mixture of phenylphenols in an amount of caustic alkali insufficient to form a normal salt with the entire amount of phenylphenols. The so-obtained solution may be treated in any desired way to separate ortho- and para-phenylphenols therefrom, such as already described herein.

As prepared industrially, the mixture of phenylphenols is usually contaminated with alkali-insoluble impurities, e. g. diphenyl oxide, diphenylene oxide, diphenyl, chlorodiphenyl and the like, hence the various procedures described may require to be adapted for obtaining the preliminary removal of such contaminants. Accordingly, the mixed ortho- and para-phenylphenols together with alkali-insoluble impurities, may be treated with an aqueous sodium hydroxide solution, preferably to make approximately a 20 to 25 per cent. solution of the sodium phenylphenates, using an excess of caustic alkali to prevent hydrolysis of the sodium salts. The so-obtained alkaline solution is extracted with a solvent, such as chlorobenzene, benzene, etc., to remove the abovementioned alkali-insoluble impurities, and then steamed, if desired, after substantial separation of the solvent, to remove residual amounts of the latter. The sodium ortho- and para-phenylphenates contained in the aqueous solution may then be hydrolyzed as above described.

For the success of the process, it is advisable to known the proportion of ortho- and para-phenylphenols in the original mixture; this being found for example, by making a melting or freezing point determination on a sample of mixed phenylphenols which has been obtained upon distillation of the product obtained by acidification of an aqueous solution of the mixed sodium salts after separation of the alkali-insoluble contaminants therefrom.

By comparing the obtained melting point with the melting point curve shown in the figure, the composition of the mixture may be found and utilized, for example, in calculating the amount of alkali required to combine with all the ortho-compound and a desired fraction of the para-compound; also in determining the amount of acid sufficient to precipitate para-phenylphenol from an aqueous solution containing soluble salts of both the ortho- and para-compounds.

The melting points of substantially pure ortho- and para-phenylphenol are about 57° C. and about 166–7° C., respectively.

The following examples illustrate ways in which our invention may be utilized.

*Example 1.*—A mixture containing 6 and 4 grams, respectively, of ortho- and para-phenylphenols (M.p. 123° C.) was dissolved in 5.65 grams aqueous sodium hydroxide solution (29 per cent.), i. e. sufficient theoretically to combine with all the ortho-compound and 25 per cent. of the para-compound present, at about 95° C. On cooling the so-obtained solution to approximately 0° C., 3.6 grams of para-phenylphenol (M.p. 165° C.) separated, i. e. the equivalent of a 90 per cent. yield. Crude ortho-compound (M.p. 76° C.) was obtained from the filtrate by acidification and filtration thereof, in an amount of 5.25 grams, or an 87.5 per cent. yield. A crude intermediate fraction of 0.1 gram (M.p. 100° C.) was obtained by diluting the liquid with 50 cc. water.

*Example 2.*—A mixture of ortho- and para-phenylphenols, containing 60 and 40 grams, respectively, of the ortho- and para-compounds, was dissolved in 80.6 grams of aqueous sodium hydroxide solution (29 per cent.), i. e. sufficient theoretically to combine with both phenylphenols, and 200 grams of water. To this aqueous solution, at a temperature of about 85° C., was added 22 grams of hydrochloric acid (36.98 per cent.), i. e. sufficient acid to form the free phenol from 95 per cent. of the para-compound present in solution. After standing one hour, the precipitate was separated from the liquid by filtration thereof, washed substantially free from salt, and dried, thereby obtaining 37.6 grams of crude para-phenylphenol, having a melting point of 158° C. To the filtrate was added 4.63 grams of hydrochloric acid (36.98 per cent.), i. e. sufficient to precipitate the remaining 5 per cent. para-compound plus 10 per cent. of the ortho-compound whereby 9 grams of crude ortho-phenylphenol of melting point 81.5° C. was obtained. After separation of the latter from the solution, the filtrate was treated with more acid, thereby forming 47 grams of crude product melting at 80.3° C. The yield of crude para-phenylphenol (M.p. 158° C.) obtained was 94 per cent. The yield of crude ortho-phenylphenol recovered was 93.3 per cent.

Other ways of carrying out our invention may be utilized. For instance, it has been found that on cooling a concentrated aqueous solution containing the sodium salts of said phenylphenols, there may be separated out a mixture of para-phenylphenol and the sodium salt of the latter, indicating conjoint hydrolysis and crystallization of the sodium salt.

Intermediate fractions of product containing appreciable amounts of mixed ortho- and para-phenylphenols may be returned to the process. The herein described method, accordingly, provides an industrial means for the separation of phenylphenols by means of hydrolysis of the alkali metal salts thereof in aqueous solution. The term "hydrolyzing" is meant to include an accelerated hydrolysis by means of adding acid to neutralize the alkali thereby formed, e. g. preferentially precipitating the more insoluble phenylphenol by means of added acid, as well as for instance, the hydrolysis produced by diluting aqueous solutions of alkali metal salts of the phenylphenols.

Other modes of applying the principle of our invention may be employed instead of the one explained, change being made as regards the details herein disclosed, provided the step or steps stated by any of the following claims or the equivalent of such be employed.

We therefore particularly point out and distinctly claim as our invention:—

1. The method of separating ortho- and para-phenylphenols, which comprises fractionally hydrolyzing a mixture of alkali-metal salts of such phenylphenols in aqueous solution, and removing the thereby formed solid phenylphenol at the end of each hydrolytic step before proceeding further.

2. The method of separating ortho- and para-phenylphenols, which comprises fractionally hydrolyzing a mixture of sodium salts of such phenylphenols in aqueous solution, and removing the thereby formed solid phenylphenol at the end of each hydrolytic step before proceeding further.

3. The method of separating ortho- and para-phenylphenols, which comprises partially hydrolyzing a mixture of alkali metal salts of such phenylphenols in aqueous solution, separating the para-phenylphenol thereby formed, and continuing the hydrolysis.

4. The method of separating ortho- and para-phenylphenols, which comprises partially hydrolyzing a mixture of sodium salts of such phenylphenols in aqueous solution, separating the para-phenylphenol thereby formed, and continuing the hydrolysis.

5. The method of separating ortho- and para-phenylphenols, which comprises partially hydrolyzing a mixture of alkali metal salts of such phenylphenols in aqueous solution, separating the para-phenylphenol thereby formed, and precipitating ortho-phenylphenol by adding acid to the residual liquid.

6. The method of separating ortho- and para-phenylphenols, which comprises partially hydrolyzing a mixture of sodium salts of such phenylphenols in aqueous solution, separating the para-phenylphenol thereby formed, and precipitating ortho-phenylphenol by adding hydrochloric acid to the residual liquid.

7. The method of separating ortho- and para-phenylphenols, which comprises partially hydrolyzing a mixture of alkali metal salts of such phenylphenols in aqueous solution, by adding acid thereto, separating the para-phenylphenol thereby formed, and continuing the hydrolysis by further addition of said acid.

8. The method of separating ortho- and para-phenylphenols, which comprises partially hydrolyzing a mixture of sodium salts of such phenylphenols in aqueous solution, by adding hydrochloric acid thereto, separating the para-phenylphenol thereby formed, and continuing the hydrolysis by further addition of said acid.

9. The method of separating ortho- and para-phenylphenols from a mixture thereof together with alkali-insoluble impurities, which comprises reacting such mixture with aqueous sodium hydroxide solution, extracting the so obtained alkaline solution with a water-insoluble organic solvent to remove the above said alkali-insoluble impurities, fractionally hydrolyzing the sodium salts of such phenylphenols, and removing the thereby formed solid phenylphenol at the end of each hydrolytic step before proceeding further.

10. The method of separating ortho- and para-phenylphenols from a mixture thereof together with alkali-insoluble impurities, which comprises reacting such mixture with an excess of aqueous sodium hydroxide solution, extracting the so obtained alkaline solution with a relatively water-insoluble solvent to remove the above said alkali-insoluble impurities, steaming the aqueous solution to remove residual solvent, partially hydrolyzing the sodium salts of such phenylphenols, and separating para-phenylphenols thereby formed.

11. The method of separating ortho- and para-phenylphenols, which comprises partially hydrolyzing a mixture of sodium salts thereof in aqueous solution and separating the thereby formed para-phenylphenol from the aqueous liquor.

Signed by us this 26 day of November, 1929.

EDGAR C. BRITTON.
FRED BRYNER.